(12) United States Patent
Abdelhamid Mohamed et al.

(10) Patent No.: US 9,286,579 B2
(45) Date of Patent: Mar. 15, 2016

(54) RESERVATION SYSTEM WITH GRAPHICAL USER INTERFACE

(75) Inventors: Mahmoud A. Abdelhamid Mohamed, Hawthorne, NY (US); Hani T. Jamjoom, White Plains, NY (US); Mark E. Podlaseck, Kent, CT (US); Huiming Qu, White Plains, NY (US); Zon-Yin Shae, South Salem, NY (US); Anshul Sheopuri, Hartsdale, NY (US)

(73) Assignees: International Business Machines Corporation, Armonk, NY (US); King Abdullah University of Science and Technology (SA)

( * ) Notice: Subject to any disclaimer, the term of this patent is extended or adjusted under 35 U.S.C. 154(b) by 156 days.

(21) Appl. No.: 13/173,018

(22) Filed: Jun. 30, 2011

(65) Prior Publication Data

US 2012/0004937 A1 Jan. 5, 2012

Related U.S. Application Data

(60) Provisional application No. 61/360,649, filed on Jul. 1, 2010.

(51) Int. Cl.
*G06Q 10/02* (2012.01)
*G06Q 10/10* (2012.01)

(52) U.S. Cl.
CPC ............ *G06Q 10/02* (2013.01); *G06Q 10/1093* (2013.01)

(58) Field of Classification Search
CPC . G06Q 10/02; G06Q 10/025; G06Q 10/1095; G06Q 10/06314; G06Q 10/109–10/1097
USPC .......................................... 705/5–6; 715/963
See application file for complete search history.

(56) References Cited

U.S. PATENT DOCUMENTS

| 4,790,028 | A | * | 12/1988 | Ramage | G06F 3/04845 345/173 |
|---|---|---|---|---|---|
| 7,640,179 | B1 | * | 12/2009 | Sachedina | 705/7.31 |
| 2002/0095319 | A1 | * | 7/2002 | Swart et al. | 705/6 |
| 2002/0116234 | A1 | * | 8/2002 | Nagasawa | 705/5 |
| 2003/0154112 | A1 | * | 8/2003 | Neiman et al. | 705/5 |
| 2004/0006556 | A1 | * | 1/2004 | Kwoh | 707/1 |
| 2005/0246666 | A1 | * | 11/2005 | Kalinoski et al. | 715/963 |
| 2006/0167725 | A1 | * | 7/2006 | Grunspan | G06Q 10/02 705/5 |

(Continued)

OTHER PUBLICATIONS

Buring, et al., User Interaction with Scatterplots on Small Screens—A Comparative Evaluation of Geometric-Semantic Zoom and Fisheye Distortion, IEEE Transactions on Visualization and Computer Graphics, vol. 12, No. 5, Sep./Oct. 2006.*

(Continued)

*Primary Examiner* — Daniel Vetter
(74) *Attorney, Agent, or Firm* — Ryan, Mason & Lewis, LLP

(57) ABSTRACT

Techniques for providing a reservation system are provided. The techniques include displaying a scalable visualization object, wherein the scalable visualization object comprises an expanded view element of the reservation system depicting information in connection with a selected interval of time and a compressed view element of the reservation system depicting information in connection with one or more additional intervals of time, maintaining a visual context between the expanded view and the compressed view within the visualization object, and enabling a user to switch between the expanded view and the compressed view to facilitate use of the reservation system.

16 Claims, 4 Drawing Sheets

(56) References Cited

U.S. PATENT DOCUMENTS

| | | | |
|---|---|---|---|
| 2007/0094665 A1* | 4/2007 | Jackson | 718/104 |
| 2008/0082925 A1* | 4/2008 | Brush | G06Q 10/1093 715/744 |
| 2008/0304367 A1* | 12/2008 | Forstall | G06Q 10/109 368/28 |
| 2008/0313004 A1* | 12/2008 | Ryan et al. | 705/9 |
| 2008/0313005 A1* | 12/2008 | Nessland et al. | 705/8 |
| 2009/0063245 A1* | 3/2009 | Anderson | 705/8 |
| 2009/0094088 A1* | 4/2009 | Chen et al. | 705/9 |
| 2009/0216569 A1* | 8/2009 | Bonev et al. | 705/5 |
| 2009/0217201 A1* | 8/2009 | Bocking et al. | 715/810 |
| 2009/0307045 A1* | 12/2009 | Chakra et al. | 705/9 |
| 2010/0070323 A1* | 3/2010 | Polcari et al. | 705/8 |
| 2010/0078475 A1* | 4/2010 | Lin et al. | 235/380 |
| 2010/0162105 A1* | 6/2010 | Beebe et al. | 715/273 |
| 2010/0211419 A1* | 8/2010 | Nickolayev et al. | 705/5 |
| 2011/0022967 A1* | 1/2011 | Vijayakumar et al. | 705/319 |

OTHER PUBLICATIONS

Bederson et al., DateLens, Fisheye Calendar for PDAs, http://portal.acm.org/citation.cfm?doid=972648.972652 ACM Transactions on Computer-Human Interaction, vol. 11, No. 1, Mar. 2004, pp. 90-119.

Furnas, Fisheye Calendar System, http://www.si.umich.edu/~furnas/Papers/FisheyeCalendarTM.pdf Nov. 19, 1991, pp. 1-9.

* cited by examiner

RESERVATION SYSTEM WITH GRAPHICAL USER INTERFACE

CROSS-REFERENCE TO RELATED APPLICATIONS

The present application claims priority to U.S. Provisional Application Ser. No. 61/360,649, filed Jul. 1, 2010, incorporated by reference herein.

FIELD OF THE INVENTION

Embodiments of the invention generally relate to information technology, and, more particularly, to reservation systems.

BACKGROUND OF THE INVENTION

Making reservations for items such as, for example, scarce computational resources (such as those found in a high performance computing (HPC) environment) can be a cumbersome and challenging process. In some existing approaches, reservations involve phone calls, e-mails, and/or instant messages between end users and system administrators to coordinate configuration and availability. Other existing approaches use simple hypertext markup language (HTML) interfaces, however, such simple HTML-based interfaces do not provide end-users with the awareness to make cost-conscious or socially-aware decisions about when to make reservations.

SUMMARY OF THE INVENTION

Principles and embodiments of the invention provide techniques for providing a reservation system with a graphical user interface. An exemplary method (which may be computer-implemented) for providing a reservation system, according to one aspect of the invention, can include steps of displaying a scalable visualization object, wherein the scalable visualization object comprises an expanded view element of the reservation system depicting information in connection with a selected interval of time and a compressed view element of the reservation system depicting information in connection with one or more additional intervals of time, maintaining a visual context between the expanded view and the compressed view within the visualization object, and enabling a user to switch between the expanded view and the compressed view to facilitate use of the reservation system.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
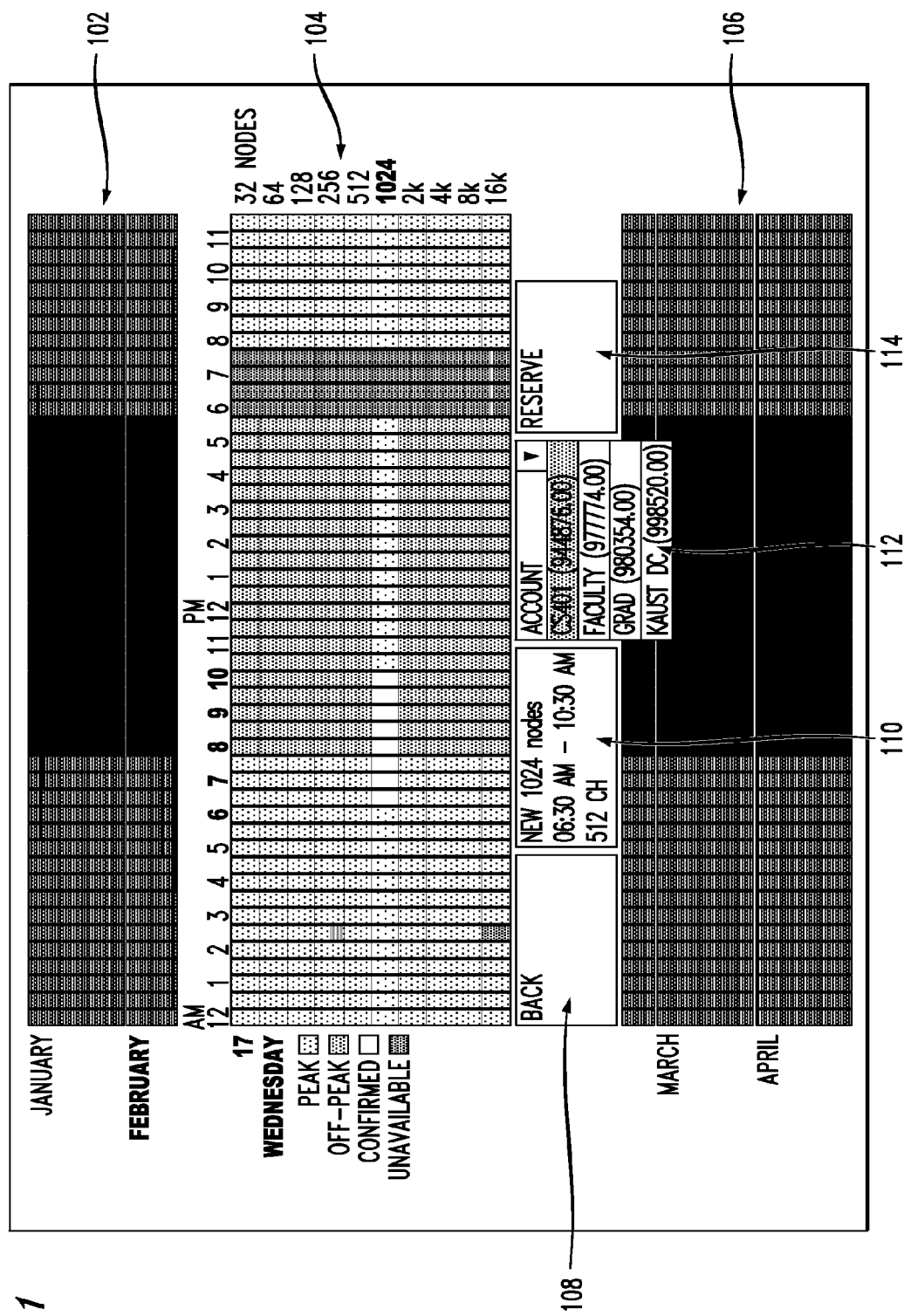
FIG. 1 is a diagram illustrating an example screen image, according to an embodiment of the invention.

Principles of the invention include providing a graphical user interface (GUI) for configuring and reserving items such as, for example, scarce computational resources. As detailed herein, one or more embodiments of the invention include providing a graphical user interface to a reservation system that is embodied within a visualization that depicts detailed information about pricing and configuration options for a selected interval of time as well as summary information about pricing and an end-user's confirmed reservations for a longer interval of time.

As detailed herein, interaction with a visualization enables an end-user to explore pricing alternatives, find times that friends and collaborators have already reserved, configure options, and finally, reserve the resources. In one or more embodiments of the invention, a primary component of the graphical user interface is a visualization that compresses a large amount of time-based information into a relatively small region. Additionally, in one or more embodiments of the invention, the visualization can include the capacity to scale, for example, from mobile devices to large displays, and maintain a consistent interactive model across these sizes.

One or more embodiments of the invention can include an element of the visualization that serves as an expanded view, for example, of a single day, depicted as a grid. By way of example and not limitation, the x-axis can represent a day in increments corresponding to the minimum duration for which resources can be reserved (for example, 30 minutes). The y-axis, for instance, can depict one or more possible variations of a type of resource, such as, for example, number of central processing units (CPUs), amount of storage, etc. The cells in the grid can be demarcated (for example, shaded) to represent, by way of example, variations in price for resources. In one or more embodiments of the invention, unavailable resources can also be demarcated to reflect their status.

Within an expanded day grid, one or more embodiments of the invention can include resizing a movable "lens" to a width that corresponds to the desired duration of the reservation in process. Moving this lens across the grid can, for example, display the total cost for the corresponding resource configuration at the time shown and for the duration specified by the lens. In one or more embodiments of the invention, by way of example, this lens can be moved across the grid via the user dragging a cursor on the display.

Additionally, in one or more embodiments of the invention, an expanded day grid can display members belonging to the same groups as the user who have already scheduled a resource during the specified interval, thus encouraging and facilitating real-time collaboration whenever possible. Further, one or more embodiments of the invention can include selecting a desired resource and time period to expand other resources to be configured as part of the reservation. Such items can be navigated similarly to the items detailed herein.

One or more embodiments of the invention also include an additional element of the visualization that serves as a compressed view of a longer period of time than the expanded view (for example, several weeks, months, etc.). Within a compressed view, each shorter measure of time (for example, each day) within the larger scope of time depicted by the compressed view can be depicted, for example, as a horizontal band. Demarcation (for example, shading) of these bands can indicate a number of variations such as, for example, variations in pricing.

One or more embodiments of the invention can also include depicting past and future reservations in the compressed view, for example, by demarcating each band (that is, each band representing an existing reservation), thus facilitating the rapid identification of past and future activity. Additionally, in one or more embodiments of the invention, through mouse and/or cursor rollover, a user can examine historical data from past sessions.

In one or more embodiments of the invention, when selected, a compressed time period (for example, a day) expands into a grid similar to that described herein with respect to the expanded view, and the previously expanded time period is compressed to a horizontal band.

FIG. 1 is a diagram illustrating an example screen image, according to an embodiment of the invention. By way of illustration, FIG. 1 depicts compressed view elements 102 and 106, as well as expanded view element 104. FIG. 1 additionally depicts a selectable "back" option element 108 (wherein a user can opt to return to a previous portion of the reservation selection process), and a reservation identification element 110 (wherein information pertaining to the currently selected reservation (such as time and price) is displayed). FIG. 1 further depicts an account selection element 112 (wherein a user is presented with one or more accounts that can be selected to use for payment for the potential reservation) and a reservation selection element 114 (wherein the user can make the reservation).

As noted, FIG. 1 depicts an example reservation grid. Slots for the entire range of node configurations (from 32 nodes to 16 k nodes) are displayed in 30-minute intervals. Available cells are shaded to indicate relative pricing, as determined, for example, by a variable pricing algorithm (denoting in FIG. 1, for example, in units of compute hours (CH)). Dark cells indicate more expensive peak pricing, while lighter cells indicate less expensive off-peak pricing. Unavailable cells are disabled and displayed as dark gray, and confirmed reservations are displayed in white.

In one or more embodiments of the invention, to make a reservation, a user configures a small floating lens to the desired time interval and drags it across the grid. The lens responds to its location by displaying the price for the reservation as indicated. If more than one time period cell (such as each thirty-minute cell in FIG. 1) is included in the specified interval, the price for each component cell is itemized. Also, in one or more embodiments of the invention, discounts, if any, can be displayed, explained, and applied to the total.

One factor in a user's decision to purchase a reservation at one price instead of another reservation at a different price can be an awareness of how the purchase affects his or her budget. To promote this understanding, one or more embodiments of the invention can additionally include displaying two projected budget depletion date/times. The first is based on the user's daily usage history plus any additional future reservations. The second is the same, but incorporates the reservation under evaluation into the projection.

Accordingly, variable pricing and its depiction in the reservation grid can facilitate users to distribute their reservations and thus, better balance the usage of system resources. Nevertheless, one or more embodiments of the invention can support a substantial number of simultaneous users. One or more embodiments of the invention can include a presence awareness feature in the reservation grid that enables users to make reservations when people who share a "common ground" are already making reservations, and thus to self-cluster around various times. Common ground examples might include working with the same data set, working on the same homework assignment, using the same software package, etc. In one or more embodiments of the invention, a list of names can appear below each time period interval. By way of example and not limitation, these names can include the user's friends and colleagues who have already made a reservation for that time. The length of the list can serve, for example, as a general indication as to how socially active a slot may be.

In addition, in one or more embodiments of the invention, such a list is elastic, so that hovering over the list with a cursor zooms the names of the classmates. Further, in one or more embodiments of the invention, the exposure of characteristics shared by strangers can further enhance the "stickiness" of time slots. Example traits to depict can include, for example, shared membership in social network groups, common teams, shared datasets, assignments, or research goals, levels and areas of expertise, etc.

Figure 2:
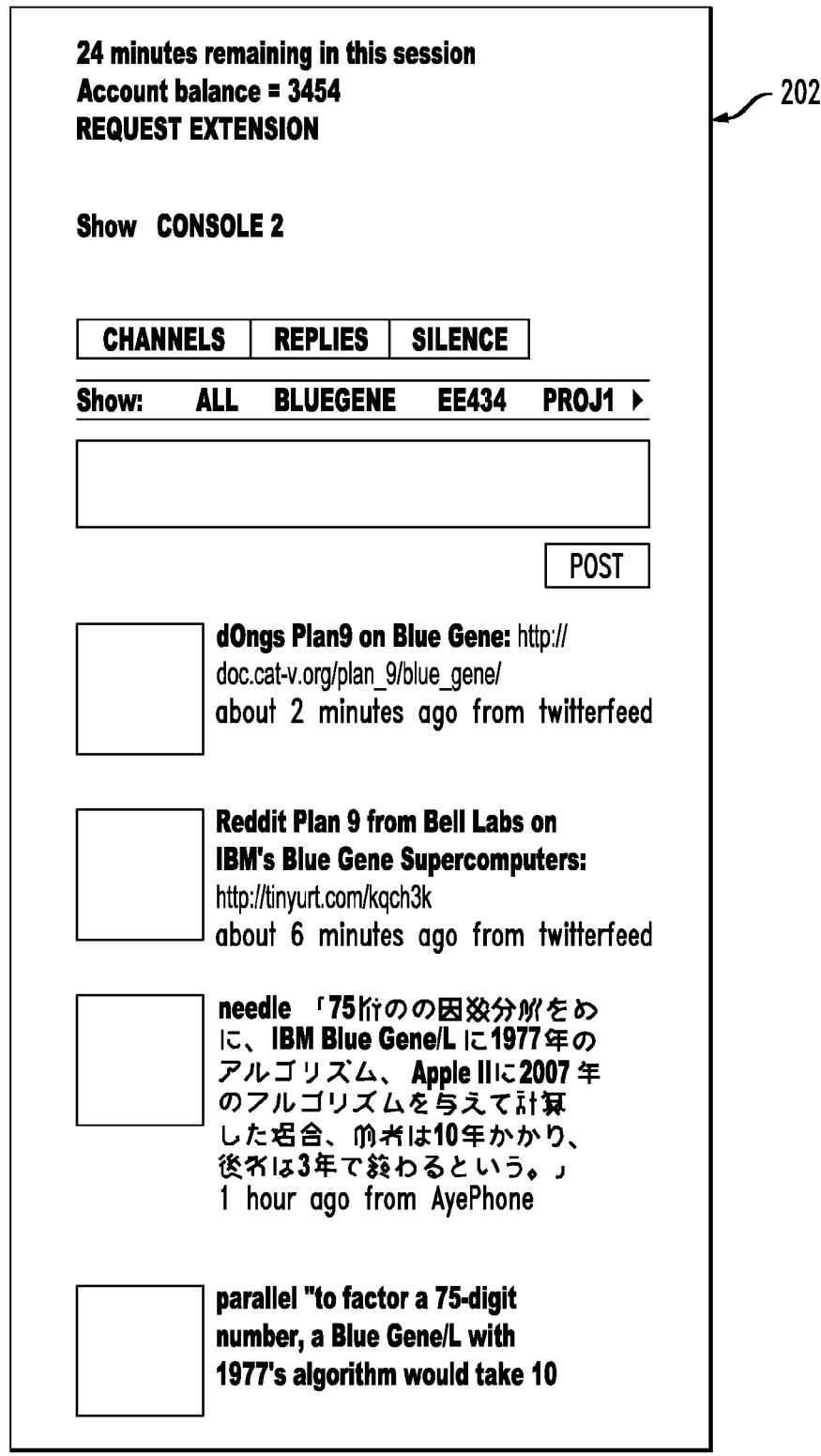
FIG. 2 is a diagram illustrating an example screen image, according to an embodiment of the invention.

FIG. 2 is a diagram illustrating an example screen image 202, according to an embodiment of the invention. As detailed herein, one or more embodiments of the invention can include a web-based application that integrates, by way of example, HPC service catalog, calendaring system console(s), social awareness, communication channels, account management, etc. By way of illustration, FIG. 2 depicts an embodiment of the invention that includes enabling integration of Twitter-like channels providing synchronous and asynchronous contextual collaboration around, for example, classes, research projects, datasets, technical interests, application domains, etc. As illustrated, one or more embodiments of the invention can surface subscribers to shared channels during a reservation process so that users with similar interests can attract each other to make overlapping reservations, if so desired.

Additionally, one or more embodiments of the invention include self and community enablement. Accordingly, interactive visualization of an HPC service catalog can enable end-user created and maintained reservations to reveal fluctuations in pricing to better shape demand and display impact of usage and purchasing decisions on personal budget to provide a rich user experience.

Figure 3:
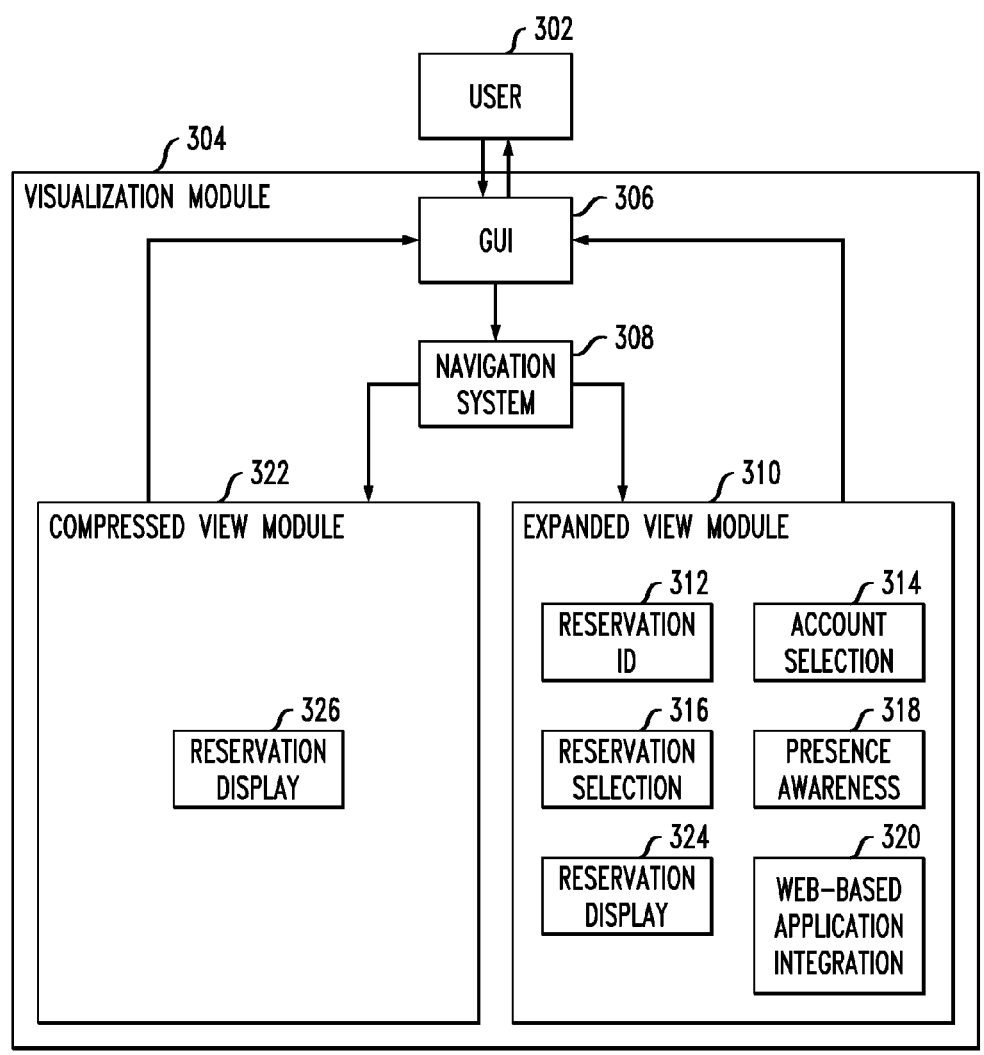
FIG. 3 is a block diagram illustrating an exemplary embodiment, according to an aspect of the invention.

FIG. 3 is a block diagram illustrating an exemplary embodiment, according to an aspect of the invention. By way of illustration, FIG. 3 depicts a user 302 which interacts with visualization module 304 via a graphical user interface (GUI) module 306. As depicted in FIG. 3, the visualization module 304 also includes a navigation system module 308, and a compressed view module 322 and an expanded view module 310, each of which contain a reservation display module (326 and 324, respectively) which depicts previously acquired reservations. Further, the expanded view module 310 additionally includes a reservation identification (ID) module 312, an account selection module 314, a reservation selection module 316, a presence awareness module 318 and a web-based application integration module 320.

As illustrated in FIG. 3, the user 302 can navigate the visualization module 302 via use of the navigation system module 308 through providing input to the GUI module 306. Input, in the form, for example, of the user's navigational choices and/or selections, can be forwarded to one or both of the compressed view module 322 and expanded view module 310. Further, depending on the user's navigational choices and/or selections, zero or more of the sub-modules (that is, reservation ID module, account selection module, reservation selection module, presence awareness module and web-based application integration module) can be exercised, as detailed herein, by way of the navigation system module. The modules (and sub-modules) of the compressed view module and the expanded view module can provide input back to the user via the GUI module in response to the user's navigation choices and/or selections.

Figure 4:
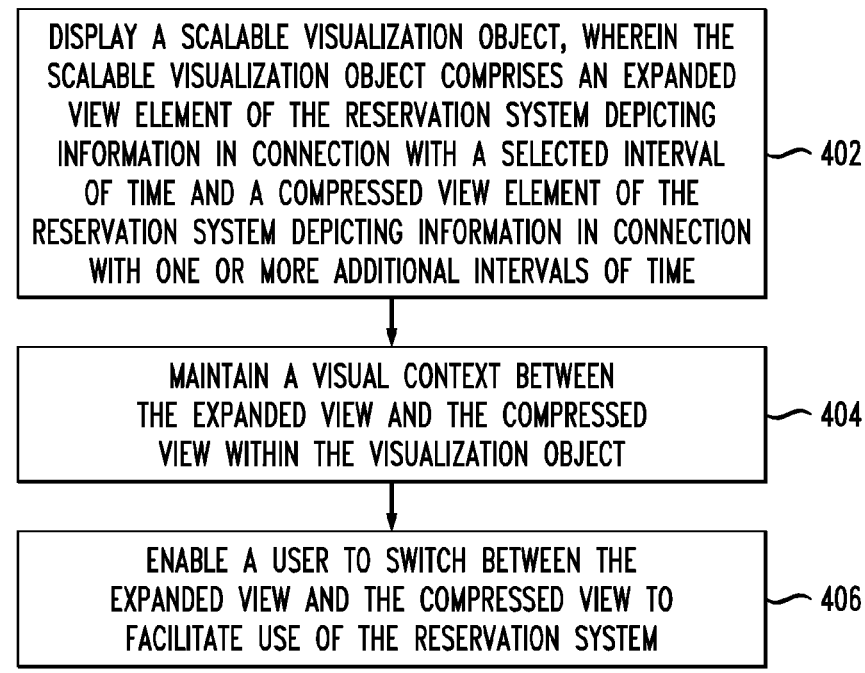
FIG. 4 is a flow diagram illustrating techniques for providing a reservation system, according to an embodiment of the invention.

FIG. 4 is a flow diagram illustrating techniques for providing a reservation system, according to an embodiment of the present invention. Step 402 includes displaying a scalable visualization object, wherein the scalable visualization object comprises an expanded view element of the reservation system depicting information in connection with a selected interval of time and a compressed view element of the reservation system depicting information in connection with one or more additional intervals of time. This step can be carried out, for example, using a graphical user interface (GUI) module, a compressed view module and/or an expanded view module. The information can include, for example, a pricing option, an account selection element, a configuration option, and/or a confirmed reservation item.

Step 404 includes maintaining a visual context between the expanded view and the compressed view within the visualization object. This step can be carried out, for example, using a GUI module and/or a visualization module. The expanded view can include, for example, a grid, which can include an x-axis representing the selected interval of time in increments corresponding to at least a minimum duration for which a reservation can be made and a y-axis representing at least one item to be reserved (for example, a computational resource). Such a grid can further include a plurality of grid cells representing information in connection with at least one item to be reserved.

The compressed view can include, for example, one or more of demarcated sections, wherein each demarcated section corresponds to a predefined interval of time and wherein each demarcated section represents reservation information for the predefined interval of time.

Step 406 includes enabling a user to switch between the expanded view and the compressed view to facilitate use of the reservation system. This step can be carried out, for example, using a GUI module and/or a navigation system module. Enabling a user to switch between the expanded view and the compressed view can include providing a navigation system. The navigation system can include, for example, an interface enabling a user to select a desired duration of a reservation, an interface enabling a user to select a desired item to be reserved, and/or an interface enabling a user to select a desired time interval.

The techniques depicted in FIG. 4 can also include displaying two projected budget depletion status representations (date/times), wherein a first projected budget depletion status representation is based on a user's daily usage history plus any additional future reservations, and a second projected budget depletion status representation is based on a user's daily usage history plus any additional future reservations, and incorporates a reservation under evaluation into the projection. Additionally, one or more embodiments of the invention can include providing a presence awareness feature, wherein the presence awareness feature includes a list of names that appear below each time period interval in the reservation system. Further, one or more embodiments of the invention include providing a web-based application integration feature, wherein the web-based application integration feature enables access to a web-based application in the reservation system.

The techniques depicted in FIG. 4 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a graphical user interface (GUI) module, a visualization module, a navigation system module, a compressed view module, an expanded view module, a reservation identification module, an account selection module, a reservation selection module, a presence awareness module and a web-based application integration module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 5:
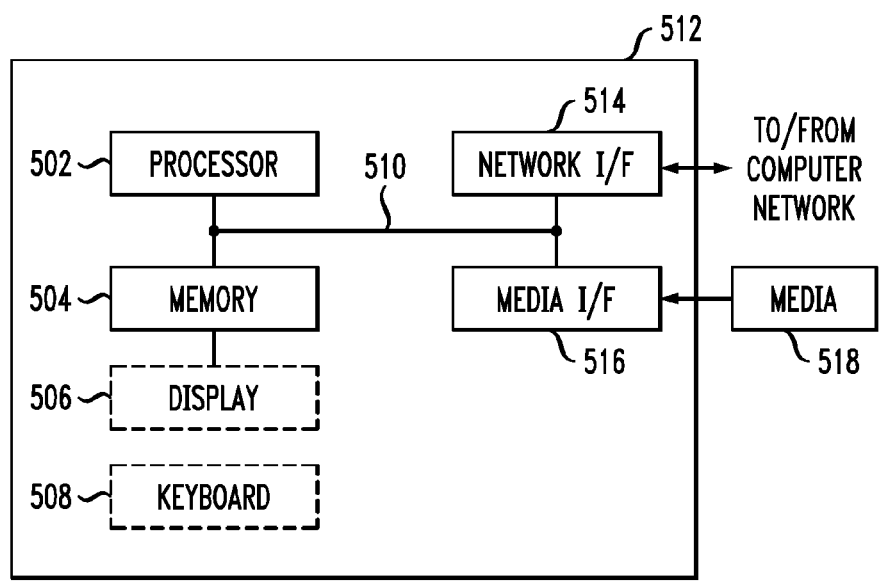
FIG. 5 is a system diagram of an exemplary computer system on which at least one embodiment of the invention can be implemented.

One or more embodiments can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 518 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 3. The method steps can then be carried out using the distinct software modules and/or sub-modules of the system, as described above, executing on one or more hardware processors 502. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, implementing an interactive visualization of an HPC service catalog to better shape demand and display impact of usage and purchasing decisions on personal budget to provide a rich user experience.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for providing a reservation system, said method comprising the steps of:
displaying a scalable visualization object, wherein said scalable visualization object comprises:
an expanded view element of said reservation system depicting information in connection with a selected interval of time, wherein said information in connection with the selected interval of time comprises (i) an account selection element presenting multiple payment account options that can be selected to use for payment for a potential reservation of the selected interval of time, and (ii) a presence awareness element to support multiple simultaneous reservations for the selected interval of time by multiple respective users, wherein the multiple respective users are visually identified by name and by multiple user characteristics directly on the scalable visualization object, wherein said multiple user characteristics comprise (a) a resource reserved for the selected interval of time, (b) an assignment on which the respective user is working during the selected interval of time, (c) an association of the respective user to a given social network group, (d) an association of the respective user to a given enterprise-related group, and (e) a subject matter area of focus, and wherein said multiple user characteristics enable the reservation system to facilitate collaborations of multiple users having one or more shared characteristics, and
wherein said expanded view comprises:
a grid comprising:
an x-axis representing said selected interval of time in increments corresponding to at least a minimum duration for which a reservation can be made;
a y-axis representing at least one item to be reserved, wherein the at least one item comprises a computational resource comprising node configurations; and
a plurality of grid cells representing information in connection with the at least one item to be reserved, wherein the plurality of grid cells are demarcated via multiple distinct shadings to represent a corresponding number of multiple distinct variations in price determined by a variable pricing algorithm and availability for the at least one item to be reserved, wherein (i) a first shading indicates a more expensive peak pricing, (ii) a second shading indicates less expensive off-peak pricing, (iii) a third shading indicates an unavailable cell, and (iv) a fourth shading indicates a confirmed reservation; and
a user-configurable lens, wherein said lens is sized by the user to a width that corresponds to a desired duration of a potential reservation, and wherein said lens is moved across the grid by the user to display a total cost for a corresponding resource configuration at a time and for the duration specified via user-configuration of the lens; and
a compressed view element of said reservation system depicting information in connection with one or more additional intervals of time;
displaying, within the context of the expanded view element, two projected budget depletion status representations, wherein:
a first of the two projected budget depletion status representations illustrates a remaining amount of a current user budget associated with a pending interval of time based on a cost of the user's completed usage history within the pending interval of time plus a cost of all additional future reservations purchased by the user and scheduled to be completed at a future instance within the pending interval of time, and
a second of the two projected budget depletion status representations illustrates a remaining amount of the current user budget associated with the pending interval of time based on the cost of the user's completed usage history within the pending interval of time, plus the cost of all additional future reservations purchased by the user and scheduled to be completed at a future instance within the pending interval of time, plus a cost for a given reservation under evaluation by the user;
maintaining a visual context between said expanded view and said compressed view within said visualization object; and
enabling a user to switch between said expanded view and said compressed view to facilitate use of the reservation system.

2. The method of claim 1, wherein said information comprises a pricing option.

3. The method of claim 1, wherein said information comprises a configuration option.

4. The method of claim 1, wherein said information comprises a confirmed reservation item.

5. The method of claim 1, wherein the at least one item to be reserved comprises a computational resource.

6. The method of claim 1, wherein enabling a user to switch between said expanded view and said compressed view comprises providing a navigation system.

7. The method of claim 6, wherein said navigation system comprises an interface enabling a user to select a desired duration of a reservation.

8. The method of claim 6, wherein said navigation system comprises an interface enabling a user to select a desired item to be reserved.

9. The method of claim 6, wherein said navigation system step comprises an interface enabling a user to select a desired time interval.

10. The method of claim 1, wherein said compressed view comprises one or more of demarcated sections, wherein each of said demarcated sections corresponds to a predefined interval of time and wherein each of said demarcated sections represents reservation information for said predefined interval of time.

11. The method of claim 1, further comprising providing a web-based application integration feature, wherein the web-based application integration feature enables access to a web-based application in the reservation system.

12. The method of claim 1, further comprising providing a system, wherein the system comprises one or more distinct software modules, each of the one or more distinct software modules being embodied on a tangible computer-readable recordable storage medium, and wherein the one or more distinct software modules comprise a graphical user interface module, a visualization module, a navigation system module, a compressed view module and an expanded view module executing on a hardware processor.

13. A tangible computer readable recordable storage medium including:
computer useable program code for providing a reservation system including:
computer useable program code for displaying a scalable visualization object, wherein said scalable visualization object comprises:
an expanded view element of said reservation system depicting information in connection with a selected interval of time, wherein said information in connection with the selected interval of time comprises (i) an account selection element presenting multiple payment account options that can be selected to use for payment for a potential reservation of the selected interval of time, and (ii) a presence awareness element to support multiple simultaneous reservations for the selected interval of time by multiple respective users, wherein the multiple respective users are visually identified by name and by multiple user characteristics directly on the scalable visualization object, wherein said multiple user characteristics comprise (a) a resource reserved for the selected interval of time, (b) an assignment on which the respective user is working during the selected interval of time, (c) an association of the respective user to a given social network group, (d) an association of the respective user to a given enterprise-related group, and (e) a subject matter area of focus, and wherein said multiple characteristics enable the reservation system to facilitate collaborations of multiple users having one or more shared characteristics, and
wherein said expanded view comprises:
a grid comprising:
an x-axis representing said selected interval of time in increments corresponding to at least a minimum duration for which a reservation can be made;
a y-axis representing at least one item to be reserved, wherein the at least one item comprises a computational resource comprising node configurations; and
a plurality of grid cells representing information in connection with the at least one item to be reserved, wherein the plurality of grid cells are demarcated via multiple distinct shadings to represent a corresponding number of multiple distinct variations in price determined by a variable pricing algorithm and availability for the at least one item to be reserved, wherein (i) a first shading indicates a more expensive peak pricing, (ii) a second shading indicates less expensive off-peak pricing, (iii) a third shading indicates an unavailable cell, and (iv) a fourth shading indicates a confirmed reservation; and
a user-configurable lens, wherein said lens is sized by the user to a width that corresponds to a desired duration of a potential reservation, and wherein said lens is moved across the grid by the user to display a total cost for a corresponding resource configuration at a time and for the duration specified via user-configuration of the lens; and
a compressed view element of said reservation system depicting information in connection with one or more additional intervals of time;
computer useable program code for displaying, within the context of the expanded view element, two projected budget depletion status representations, wherein:
a first of the two projected budget depletion status representations illustrates a remaining amount of a current user budget associated with a pending interval of time based on a cost of the user's completed usage history within the pending interval of time plus a cost of all additional future reservations purchased by the user and scheduled to be completed at a future instance within the pending interval of time, and
a second of the two projected budget depletion status representations illustrates a remaining amount of the current user budget associated with the pending interval of time based on the cost of the user's completed usage history within the pending interval of time, plus the cost of all additional future reservations purchased by the user and scheduled to be completed at a future instance within the pending interval of time, plus a cost for a given reservation under evaluation by the user;
computer useable program code for maintaining a visual context between said expanded view and said compressed view within said visualization object; and
computer useable program code for enabling a user to switch between said expanded view and said compressed view to facilitate use of the reservation system.

14. The tangible computer readable recordable storage medium of claim 13, wherein said information further comprises at least one of a pricing option, a configuration option, and a confirmed reservation item.

15. A system for providing a reservation system, comprising:
a memory; and
at least one processor coupled to the memory and operative to:
display a scalable visualization object, wherein said scalable visualization object comprises:
an expanded view element of said reservation system depicting information in connection with a selected interval of time, wherein said information in connection with the selected interval of time comprises (i) an account selection element presenting multiple payment account options that can be selected to use for payment for a potential reservation of the selected interval of time, and (ii) a presence awareness element to support multiple simultaneous reservations for the selected interval of time by multiple respective users, wherein the multiple respective users are visually identified by name and by multiple user characteristics directly on the scalable visualization object, wherein said multiple user characteristics comprise (a) a resource reserved for the selected interval of time, (b) an assignment on which the respective user is working during the selected interval of time, (c) an association of the respective user to a given social network group, (d) an association of the respective user to a given enterprise-related group, and (e) a subject matter area of focus, and wherein said multiple characteristics enable the reservation system to facilitate collaborations of multiple users having one or more shared characteristics, and
wherein said expanded view comprises:
a grid comprising:
an x-axis representing said selected interval of time in increments corresponding to at least a minimum duration for which a reservation can be made;
a y-axis representing at least one item to be reserved, wherein the at least one item comprises a computational resource comprising node configurations; and
a plurality of grid cells representing information in connection with the at least one item to be reserved, wherein the plurality of grid cells are demarcated via multiple distinct shadings to represent a corresponding number of multiple distinct variations in price determined by a variable pricing algorithm and availability for the at least one item to be reserved, wherein (i) a first shading indicates a more expensive peak pricing, (ii) a second shading indicates less expensive off-peak pricing, (iii) a third shading indicates an unavailable cell, and (iv) a fourth shading indicates a confirmed reservation; and
a user-configurable lens, wherein said lens is sized by the user to a width that corresponds to a desired duration of a potential reservation, and wherein said lens is moved across the grid by the user to display a total cost for a corresponding resource configuration at a time and for the duration specified via user-configuration of the lens; and
a compressed view element of said reservation system depicting information in connection with one or more additional intervals of time;

display, within the context of the expanded view element, two projected budget depletion status representations, wherein:
- a first of the two projected budget depletion status representations illustrates a remaining amount of a current user budget associated with a pending interval of time based on a cost of the user's completed usage history within the pending interval of time plus a cost of all additional future reservations purchased by the user and scheduled to be completed at a future instance within the pending interval of time, and
- a second of the two projected budget depletion status representations illustrates a remaining amount of the current user budget associated with the pending interval of time based on the cost of the user's completed usage history within the pending interval of time, plus the cost of all additional future reservations purchased by the user and scheduled to be completed at a future instance within the pending interval of time, plus a cost for a given reservation under evaluation by the user;

maintain a visual context between said expanded view and said compressed view within said visualization object; and enabling a user to switch between said expanded view and said compressed view to facilitate use of the reservation system.

16. The system of claim 15, wherein said information further comprises at least one of a pricing option, a configuration option, and a confirmed reservation item.

* * * * *